US011789803B2

(12) United States Patent
Nair et al.

(10) Patent No.: US 11,789,803 B2
(45) Date of Patent: Oct. 17, 2023

(54) ERROR HANDLING FRAMEWORK FOR SECURITY MANAGEMENT IN A COMMUNICATION SYSTEM (71) Applicant: Nokia Technologies Oy, Espoo (FI)

(72) Inventors: Suresh Nair, Whippany, NJ (US); Anja Jerichow, Grafing bei Munich (DE); Nagendra S Bykampadi, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 245 days.

(21) Appl. No.: 17/054,949

(22) PCT Filed: May 7, 2019

(86) PCT No.: PCT/FI2019/050354
§ 371 (c)(1),
(2) Date: Nov. 12, 2020

(87) PCT Pub. No.: WO2019/220006
PCT Pub. Date: Nov. 21, 2019

(65) Prior Publication Data
US 2021/0248025 A1 Aug. 12, 2021

(30) Foreign Application Priority Data

May 16, 2018 (IN) .............................. 201841018245

(51) Int. Cl.
*G06F 11/07* (2006.01)
*H04L 45/00* (2022.01)
*H04L 9/40* (2022.01)
(52) U.S. Cl.
CPC ........ *G06F 11/079* (2013.01); *G06F 11/0709* (2013.01); *G06F 11/0751* (2013.01);
(Continued)

(58) Field of Classification Search
CPC ............... G06F 11/079; G06F 11/0709; G06F 11/0751; G06F 11/0772; G06F 11/0793
See application file for complete search history.

(56) References Cited

U.S. PATENT DOCUMENTS

| 5,073,932 A | 12/1991 | Yossifor et al. |
| 9,888,037 B1 | 2/2018 | Sharifi |

(Continued)

FOREIGN PATENT DOCUMENTS

| CN | 101622851 A | 1/2010 |
| CN | 102577212 A | 7/2012 |

(Continued)

OTHER PUBLICATIONS

Office Action received for corresponding Indian Patent Application No. 201841018245, dated Sep. 2, 2022, 6 pages.

(Continued)

*Primary Examiner* — Jigar P Patel
(74) *Attorney, Agent, or Firm* — Duft & Bornsen, PC (57) ABSTRACT In a communication system comprising a first network operatively coupled to a second network, wherein the first network comprises a first security edge protection proxy element operatively coupled to a second security edge protection proxy element of the second network, and wherein one of the first and second security edge protection proxy elements is a sending security edge protection proxy element and the other of the first and second security edge protection proxy elements is a receiving security edge protection proxy element, the receiving security edge protection proxy element receives a message from the sending security edge protection proxy element. The receiving security edge protection proxy element detects one or more error conditions associated with the received message. The receiving security edge protection proxy element determines (Continued)

one or more error handling actions to be taken in response to the one or more detected error conditions.

18 Claims, 5 Drawing Sheets

(52) U.S. Cl.
CPC ...... *G06F 11/0772* (2013.01); *G06F 11/0793* (2013.01); *H04L 45/22* (2013.01); *H04L 63/0281* (2013.01); *H04L 63/123* (2013.01); *H04L 63/166* (2013.01)

(56) References Cited

U.S. PATENT DOCUMENTS

| | | | |
|---|---|---|---|
| 2009/0210768 A1* | 8/2009 | Carlson | G06F 13/385 714/E11.044 |
| 2010/0332915 A1 | 12/2010 | Qiu et al. | |
| 2012/0036403 A1* | 2/2012 | Nishiyama | G06F 11/0733 714/57 |
| 2016/0110239 A1 | 4/2016 | Couture et al. | |
| 2017/0012941 A1* | 1/2017 | Subbarayan | H04L 63/08 |
| 2018/0007083 A1 | 1/2018 | Small et al. | |
| 2019/0075511 A1* | 3/2019 | Ryu | H04W 68/005 |

FOREIGN PATENT DOCUMENTS

| | | |
|---|---|---|
| CN | 104937965 A | 9/2015 |
| CN | 105227539 A | 1/2016 |
| CN | 106850123 A | 6/2017 |
| CN | 107548499 A | 1/2018 |
| CN | 107800664 A | 3/2018 |
| WO | 2014113922 A1 | 7/2014 |
| WO | 2017093809 A1 | 6/2017 |
| WO | 2017135702 A1 | 8/2017 |

OTHER PUBLICATIONS

Office action received for corresponding Chinese Patent Application No. 201980032356.4, dated Nov. 3, 2022, 12 pages of office action and no page of translation available.

"Security Considerations for Service Based Architecture in 5G", 3GPP TSG SA WG3 (Security) Meeting #88Bis Adhoc, S3-172533, Deutsche Telekom AG, Oct. 9-13, 2017, 4 pages.

Extended European Search Report received for corresponding European Patent Application No. 19802570.2, dated Dec. 21, 2021, 8 pages.

"Living Document: Security of Service Based Architecture of 5G phase 1", 3GPP TSG SA WG3 (Security) Meeting #91BIS, S3-181812, Agenda: 7.2.13.2, China Mobile, May 21-25, 2018, 23 pages.

"3rd Generation Partnership Project; Technical Specification Group Services and System Aspects; Security architecture and procedures for 5G system (Release 15)", 3GPP TS 33.501, V15.0.0, Mar. 2018, pp. 1-128.

"3rd Generation Partnership Project; Technical Specification Group Services and System Aspects; Procedures for the 5G System; Stage 2 (Release 15)", 3GPP TS 23.502, V15.1.0, Mar. 2018, pp. 1-285.

"3rd Generation Partnership Project; Technical Specification Group Services and System Aspects; System Architecture for the 5G System; Stage 2 (Release 15)", 3GPP TS 23.501, V15.0.0, Dec. 2017, pp. 1-181.

"3rd Generation Partnership Project; Technical Specification Group Services and System Aspects; Security architecture and procedures for 5G system (Release 15)", 3GPP TS 33.501, V0.7.0, Jan. 2018, pp. 1-109.

International Search Report and Written Opinion received for corresponding Patent Cooperation Treaty Application No. PCT/FI2019/050354, dated Jul. 4, 2019, 15 pages.

"Incorporating Contents of the SBA Living Document into the TR", 3GPP TSGSA WG3 (Security) Meeting #91, S3-181715, Agenda: 7.2.13.2, Deutsche Telekom AG, May 21-25, 2018, 21 pages.

"SEPP to SEPP N32 Message Structure", 3GPP TSG SA WG3 (Security) Meeting #91Bis, S3-181891, Agenda: 7.2.13.1, Nokia, May 21-25, 2018, 6 pages.

"Policies for IE protection at SEPP", 3GPP TSG SA WG3 (Security) Meeting #90Bis, S3-180897, Agenda: 4.1.13.1, Ericsson, Feb. 26-Mar. 2, 2018, 3 pages.

"Integrity protection for SBA over N32", 3GPP TSG SA WG3 (Security) Meeting #90Bis, S3-180897, Agenda: 4.1.13.1, Ericsson, Feb. 26-Mar. 2, 2018, 3 pages.

CN Search Report; Application 2019800323564; dated May 2023.

* cited by examiner

ERROR HANDLING FRAMEWORK FOR SECURITY MANAGEMENT IN A COMMUNICATION SYSTEM

RELATED APPLICATION

This application claims priority to PCT Application No. PCT/FI2019/050354, filed on May 7, 2019, which claims priority to IN Application No. 201841018245, filed on May 16, 2018, each of which is incorporated herein by reference in its entirety.

FIELD

The field relates generally to communication systems, and more particularly, but not exclusively, to security management within such systems.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point referred to as a gNB in a 5G network. The access point (e.g., gNB) is illustratively part of an access network of the communication system. For example, in a 5G network, the access network is referred to as a 5G System and is described in 5G Technical Specification (TS) 23.501, V15.0.0, entitled "Technical Specification Group Services and System Aspects; System Architecture for the 5G System," the disclosure of which is incorporated by reference herein in its entirety. In general, the access point (e.g., gNB) provides access for the UE to a core network (CN), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, V0.7.0, entitled "Technical Specification Group Services and System Aspects; Security Architecture and Procedures for the 5G System," the disclosure of which is incorporated by reference herein in its entirety, further describes security management details associated with a 5G network.

Security management is an important consideration in any communication system. However, due to continuing attempts to improve the architectures and protocols associated with a 5G network in order to increase network efficiency and/or subscriber convenience, security management issues can present a significant challenge.

SUMMARY

Illustrative embodiments provide improved techniques for security management in communication systems.

For example, in one illustrative embodiment, a method comprises the following steps. In a communication system comprising a first network operatively coupled to a second network, wherein the first network comprises a first security edge protection proxy element operatively coupled to a second security edge protection proxy element of the second network, and wherein one of the first and second security edge protection proxy elements is a sending security edge protection proxy element and the other of the first and second security edge protection proxy elements is a receiving security edge protection proxy element, the receiving security edge protection proxy element receives a message from the sending security edge protection proxy element. The receiving security edge protection proxy element detects one or more error conditions associated with the received message. The receiving security edge protection proxy element determines one or more error handling actions to be taken in response to the one or more detected error conditions.

In another embodiment, a method comprises the following steps. In a communication system comprising a first network operatively coupled to a second network, wherein the first network comprises a first security edge protection proxy element operatively coupled to a second security edge protection proxy element of the second network, and wherein one of the first and second security edge protection proxy elements is a sending security edge protection proxy element and the other of the first and second security edge protection proxy elements is a receiving security edge protection proxy element, and in response to detection of one or more error conditions associated with a message sent by the sending security edge protection proxy element to the receiving security edge protection proxy element, the sending security edge protection proxy element receives an error handling message from the receiving security edge protection proxy element. The sending security edge protection proxy element at least one of initiates and performs one or more error handling actions at the sending security edge protection proxy element in response to the error handling message.

Further illustrative embodiments are provided in the form of non-transitory computer-readable storage medium having embodied therein executable program code that when executed by a processor causes the processor to perform the above steps. Still further illustrative embodiments comprise apparatus with a processor and a memory configured to perform the above steps.

These and other features and advantages of embodiments described herein will become more apparent from the accompanying drawings and the following detailed description.

DETAILED DESCRIPTION

Embodiments will be illustrated herein in conjunction with example communication systems and associated techniques for providing security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) may provide further explanation of network elements/functions and/or operations that may interact with parts of the inventive solutions, e.g., the above-referenced 3GPP TS 23.501 and 3GPP TS 33.501. Other 3GPP TS/TR documents may provide other conventional details that one of ordinary skill in the art will realize. However, while well-suited for 5G-related 3GPP standards, embodiments are not necessarily intended to be limited to any particular standards.

Illustrative embodiments are related to security management associated with the Service-Based Architecture (SBA) for 5G networks. Prior to describing such illustrative embodiments, a general description of main components of a 5G network will be described below in the context of FIGS. 1 and 2.

Figure 1:
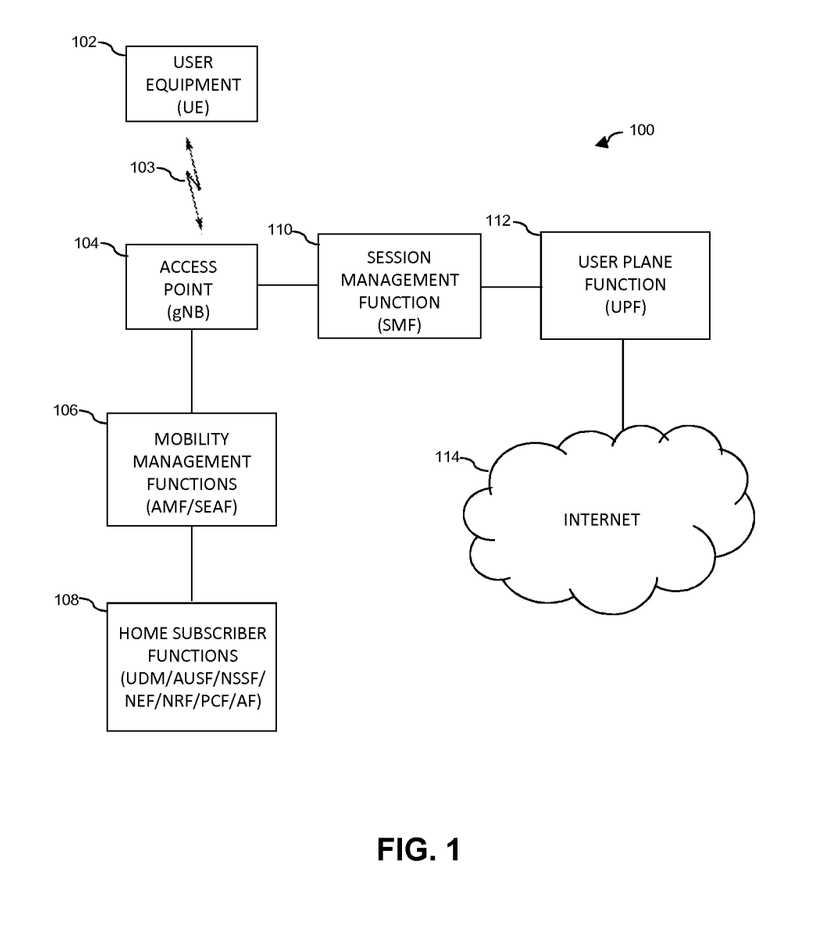
FIG. 1 illustrates a communication system with which one or more illustrative embodiments may be implemented.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used to implement some or all of the main functions represented. Also, it is to be understood that not all functions of a 5G network are depicted in FIG. 1. Rather, functions that facilitate an explanation of illustrative embodiments are represented. Subsequent figures may depict some additional elements/functions.

Accordingly, as shown, communication system 100 comprises user equipment (UE) 102 that communicates via an air interface 103 with an access point (gNB) 104. The UE 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores the permanent subscription identifier and its related key, which are used to identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as Subscription Concealed Identifier (SUCI).

The access point 104 is illustratively part of an access network of the communication system 100. Such an access network may comprise, for example, a 5G System having a plurality of base stations and one or more associated radio network control functions. The base stations and radio network control functions may be logically separate entities, but in a given embodiment may be implemented in the same physical network element, such as, for example, a base station router or femto cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) can also be implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF may also be referred to herein, more generally, as an access and mobility management entity.

The AMF 106 in this illustrative embodiment is operatively coupled to home subscriber functions 108, i.e., one or more functions that are resident in the home network of the subscriber. As shown, some of these functions include the Unified Data Management (UDM) function, as well as an Authentication Server Function (AUSF). The AUSF and UDM (separately or collectively) may also be referred to herein, more generally, as an authentication entity. In addition, home subscriber functions may include, but are not limited to, Network Slice Selection Function (NSSF), Network Exposure Function (NEF), Network Repository Function (NRF), Policy Control Function (PCF), and Application Function (AF).

The access point 104 is also operatively coupled to a serving gateway function, i.e., Session Management Function (SMF) 110, which is operatively coupled to a User Plane Function (UPF) 112. UPF 112 is operatively coupled to a Packet Data Network, e.g., Internet 114. Further typical operations and functions of such network elements are not described here since they are not the focus of the illustrative embodiments and may be found in appropriate 3GPP 5G documentation.

It is to be appreciated that this particular arrangement of system elements is an example only, and other types and arrangements of additional or alternative elements can be used to implement a communication system in other embodiments. For example, in other embodiments, the system 100 may comprise other elements/functions not expressly shown herein.

Accordingly, the FIG. 1 arrangement is just one example configuration of a wireless cellular system, and numerous alternative configurations of system elements may be used. For example, although only single elements/functions are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104.

Figure 2:
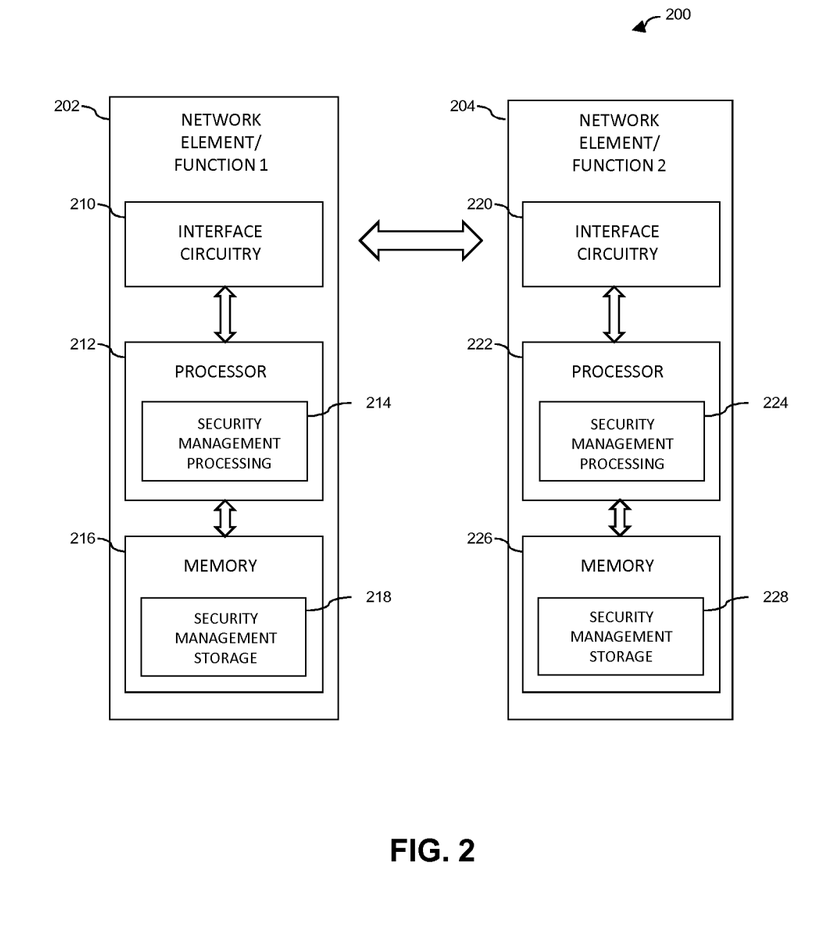
FIG. 2 illustrates network elements/functions for providing security management with which one or more illustrative embodiments may be implemented.

FIG. 2 is a block diagram of network elements/functions for providing security management in an illustrative embodiment. System 200 is shown comprising a first network element/function 202 and a second network element/function 204. It is to be appreciated that the network elements/functions 202 and 204 represent any network elements/functions that are configured to provide security management and other techniques described herein, for example, but not limited to, AMF, SERF, UDM, AUSF, NSSF, NEF, NRF, PCF and AF. Further, one or both of the first network element/function 202 and the second network element/function 204 may also represent a Security Edge Protection Proxy (SEPP), which will be described in further detail below.

The network element/function 202 comprises a processor 212 coupled to a memory 216 and interface circuitry 210. The processor 212 of the network element/function 202 includes a security management processing module 214 that may be implemented at least in part in the form of software executed by the processor. The processing module 214 performs security management described in conjunction with subsequent figures and otherwise herein. The memory 216 of the network element/function 202 includes a security management storage module 218 that stores data generated or otherwise used during security management operations.

The network element/function 204 comprises a processor 222 coupled to a memory 226 and interface circuitry 220. The processor 222 of the network element/function 204 includes a security management processing module 224 that may be implemented at least in part in the form of software executed by the processor 222. The processing module 224 performs security management described in conjunction with subsequent figures and otherwise herein. The memory 226 of the network element/function 204 includes a security management storage module 228 that stores data generated or otherwise used during security management operations.

The processors 212 and 222 of the respective network elements/functions 202 and 204 may comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware may be used in implementing the illustrative embodiments.

The memories 216 and 226 of the respective network elements/functions 202 and 204 may be used to store one or more software programs that are executed by the respective processors 212 and 222 to implement at least a portion of the functionality described herein. For example, security management operations and other functionality as described in conjunction with subsequent figures and otherwise herein may be implemented in a straightforward manner using software code executed by processors 212 and 222.

A given one of the memories 216 or 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 226 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 of the respective network elements/functions 202 and 204 illustratively comprise transceivers or other communication hardware or firmware that allows the associated system elements to communicate with one another in the manner described herein.

It is apparent from FIG. 2 that network element/function 202 is configured for communication with network element/function 204 and vice-versa via their respective interface circuitries 210 and 220. This communication involves network element/function 202 sending data to the network element/function 204, and the network element/function 204 sending data to the network element/function 202. However, in alternative embodiments, other network elements may be operatively coupled between the network elements/functions 202 and 204. The term "data" as used herein is intended to be construed broadly, so as to encompass any type of information that may be sent between network elements/functions (as well as between user equipment and a core network) including, but not limited to, messages, identifiers, keys, indicators, user data, control data, etc.

It is to be appreciated that the particular arrangement of components shown in FIG. 2 is an example only, and numerous alternative configurations may be used in other embodiments. For example, any given network element/function can be configured to incorporate additional or alternative components and to support other communication protocols.

Other system elements such as UE 102 and gNB 104 may each also be configured to include components such as a processor, memory and network interface. These elements need not be implemented on separate stand-alone processing platforms, but could instead, for example, represent different functional portions of a single common processing platform. Given the general concepts described above, illustrative embodiments that address certain security management issues will now be described. More particularly, illustrative embodiments provide security management techniques for 5G systems. The architecture for 5G systems is currently being standardized in 3GPP. As mentioned above, the 3GPP TS 23.501 defines the 5G system architecture as service-based, e.g., Service-Based Architecture (SBA).

Figure 3:
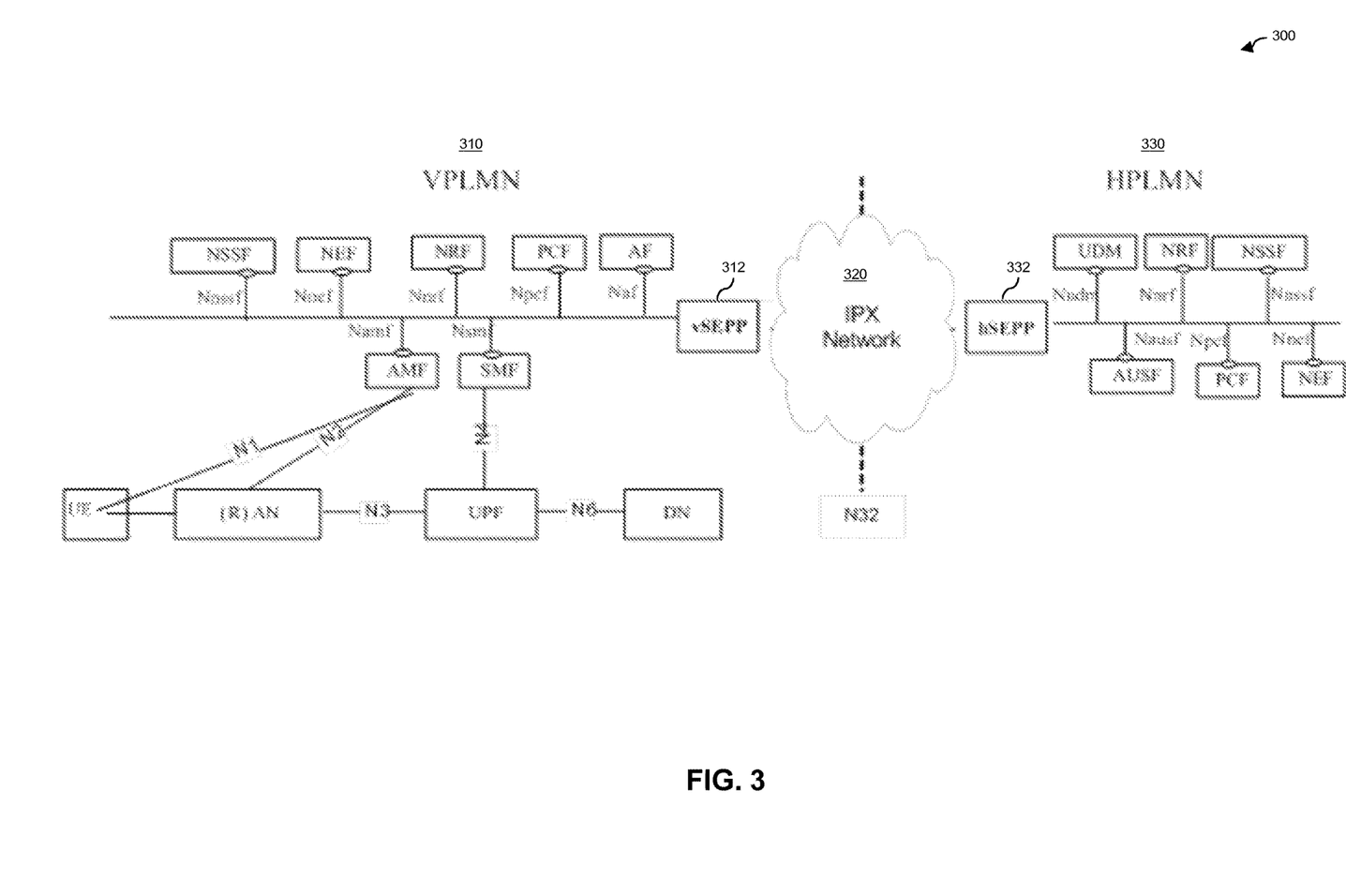
FIG. 3 illustrates a communication system architecture with security edge protection proxies between a visited network and a home network with which one or more illustrative embodiments may be implemented.

FIG. 3 depicts a 5G architecture in a configuration comprising a visited public land mobile network (VPLMN) 310 operatively coupled via an intermediate Internetwork Packet Exchange (IPX) network 320 to a home public land mobile network (HPLMN) 330. Note that there can be more than one IPX network operatively coupled between VPLMN 310 and HPLMN 330. More particularly, FIG. 3 illustrates the presence of a Security Edge Protection Proxy (SEPP) at the edge of each PLMN, i.e., vSEPP 312 in VPLMN 310 and hSEPP 332 in HPLMN 330. It is to be appreciated that the various network functions shown in the VPLMN 310 and the HPLMN 330 are known and described in detail in various 5G specifications such as, but not limited to, the above-referenced TS 23.501 and TS 33.501.

As mentioned above, in 5G, SBA is introduced to model services as network functions (NFs) that communicate with each other using Restful application programming interfaces (Representational State Transfer APIs). In the scenario where the two communicating NFs are in two different PLMNs (e.g., VPLMN 310 and HPLMN 330), communication happens over a roaming inter-network interface (N32) between the two participating PLMNs.

To protect NF specific content in the messages that are sent over the roaming inter-network interface, 5G introduces the SEPP as the entity residing at the perimeter of the PLMN network to protect the PLMN from outside traffic and additionally to implement transport layer security (TLS) and application layer security (ALS) for all the data and signaling exchanged between two inter-network network functions at the service layer. For example, the SEPP performs security management functions on information elements (IE) in HyperText Transport Protocol (HTTP) messages before the messages are sent externally over the roaming N32 interface. The protected HTTP messages are referred to as N32 messages. Protection such as ALS involves protecting information sent in various parts of the HTTP message including, but not limited to, HTTP Request/Response Line, HTTP header and HTTP Payload. However, some parts of this message may need to be modified by intermediaries (e.g., network provider of IPX 330 as shown in FIG. 3) between the two SEPPs.

Thus, in 5G SBA, the PLMN operator deploys a SEPP at the edge of its network to interoperate and obtain services from network functions in its roaming partner networks. The SEPP interfaces with one or more other SEPPs in one or more other networks over the N32 interface. As an edge proxy, the SEPP implements ALS as mentioned above to protect HTTP messages exchanged between a network function in its network and another network function in the roaming partner network.

Figure 4:
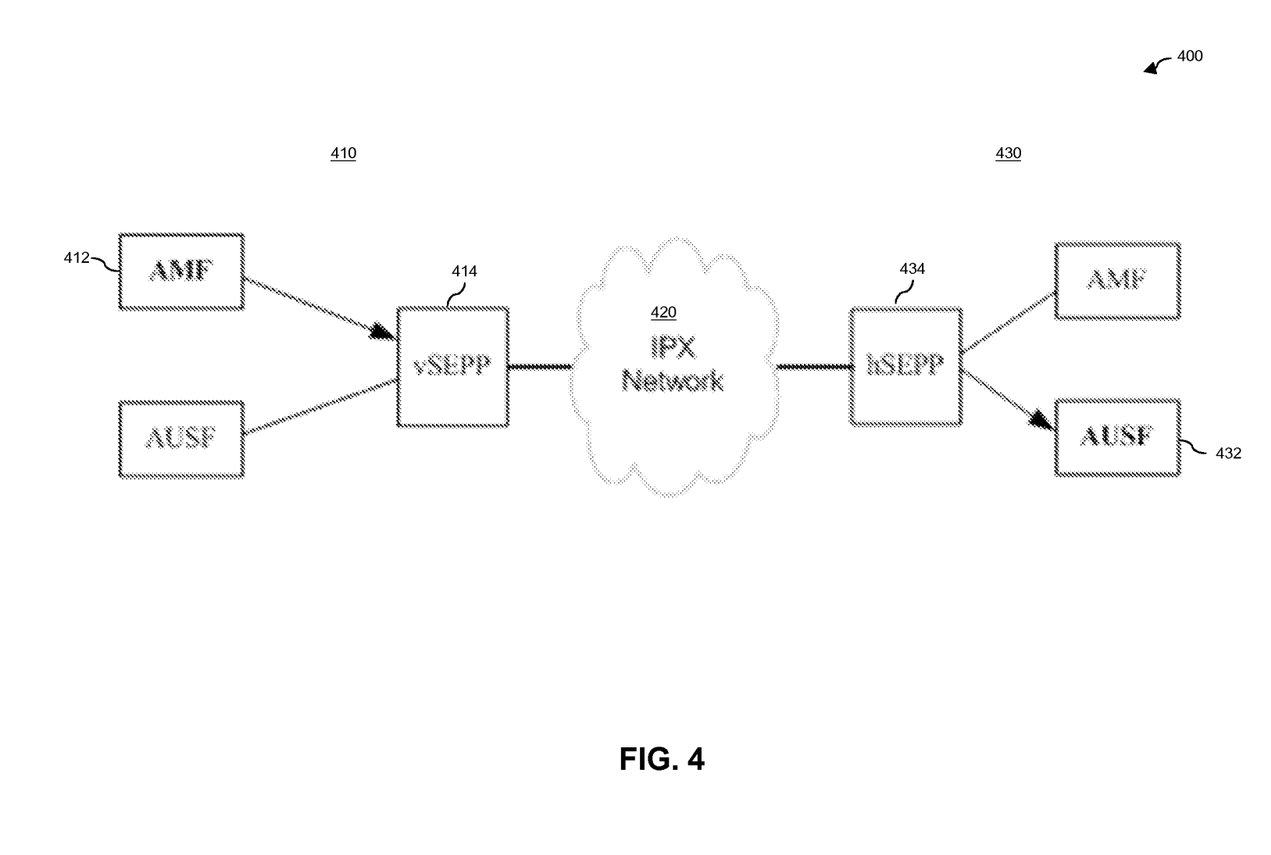
FIG. 4 illustrates an example of a message passing from a network function in a visited network to a network function in a home network via security edge protection proxies with which one or more illustrative embodiments may be implemented.

For example, FIG. 4 illustrates an example of a message passing from a network function in a visited network to a network function in a home network via security edge protection proxies. More particularly, example 400 in FIG. 4 depicts a VPLMN 410 operatively coupled via an IPX network 420 to an HPLMN 430. Assume that AMF NF 412 in VPLMN 410 invokes an API request on the AUSF NF 432 in HPLMN 430. The message flow is as follows:

a) The AMF NF 412 first sends the HTTP Request message to its local SEPP (i.e., vSEPP 414).

b) The vSEPP 414 applies ALS and sends the secure message on the N32 interface through IPX network 420 to AUSF NF 432 in HPLMN 430.

c) The hSEPP 434 is at the edge of the HPLMN 430 and receives all incoming HTTP messages from its roaming partner networks (in this case, vSEPP 414 in VPLMN 410).

d) The hSEPP 434 removes the security mechanism applied at the application layer and forwards the resulting HTTP Request message to the corresponding AUSF NF 432.

More generally, N32 messages are exchanged between two SEPPs sitting at the perimeter of the two networks. The N32 messages are generated by a sending SEPP (sSEPP) by reformatting and protecting the received HTTP message sent by an internal network function (e.g., AMF NF 412) in its network to another network function (e.g., AUSF NF 432) via a receiving SEPP (rSEPP) in the roaming partner network. Note that in one scenario, vSEPP 414 is the sSEPP and hSEPP 434 is the rSEPP, while in another scenario, hSEPP 434 is the sSEPP and vSEPP 414 is the rSEPP.

In one or more embodiments, ALS involves protecting information sent in various parts of the HTTP message including, but not limited to, HTTP Request/Response Line, HTTP header and HTTP Payload. Protection of the N32 message is achieved by integrity protection of the complete HTTP message with optional encryption of selected fields in the HTTP message. In addition, selected fields in the HTTP message are eligible for modification by authorized IPX providers (e.g., IPX 420) present in the interconnect network connecting the two operators. At the rSEPP, in one embodiment, the received N32 message is verified in a phased manner and then forwarded to the target NF in the roaming network.

In the rSEPP, the received N32 message is first verified through a series of steps before it is accepted for reassembly into a HTTP message. This process of verification may fail (i.e., result in an error condition) for many reasons. The error could be, by way of example only, due to a malicious intermediate node manipulating the N32 message resulting in an integrity check failure, packet loss due to congestion, a malicious man-in-the-middle (MITM) attacker consciously deleting part of the message related to subscription and identities or service authorization, etc.

In such an event, illustrative embodiments provide for the rSEPP to take corrective actions, which may involve reporting this event to the sSEPP for further action on its end and/or taking necessary actions locally such as, for example, logging the event for offline analysis, etc. More particularly, illustrative embodiments provide security management techniques that comprise an error handling framework. In one or more embodiments, the error handling framework comprises four parts: (1) the rSEPP detects an error and decides how to resolve the error; (2) error handling actions initiated by or otherwise performed by the rSEPP; (3) signaling flow to update (inform) the sSEPP; and (4) error handling actions initiated by or otherwise performed by the sSEPP.

Figure 5:
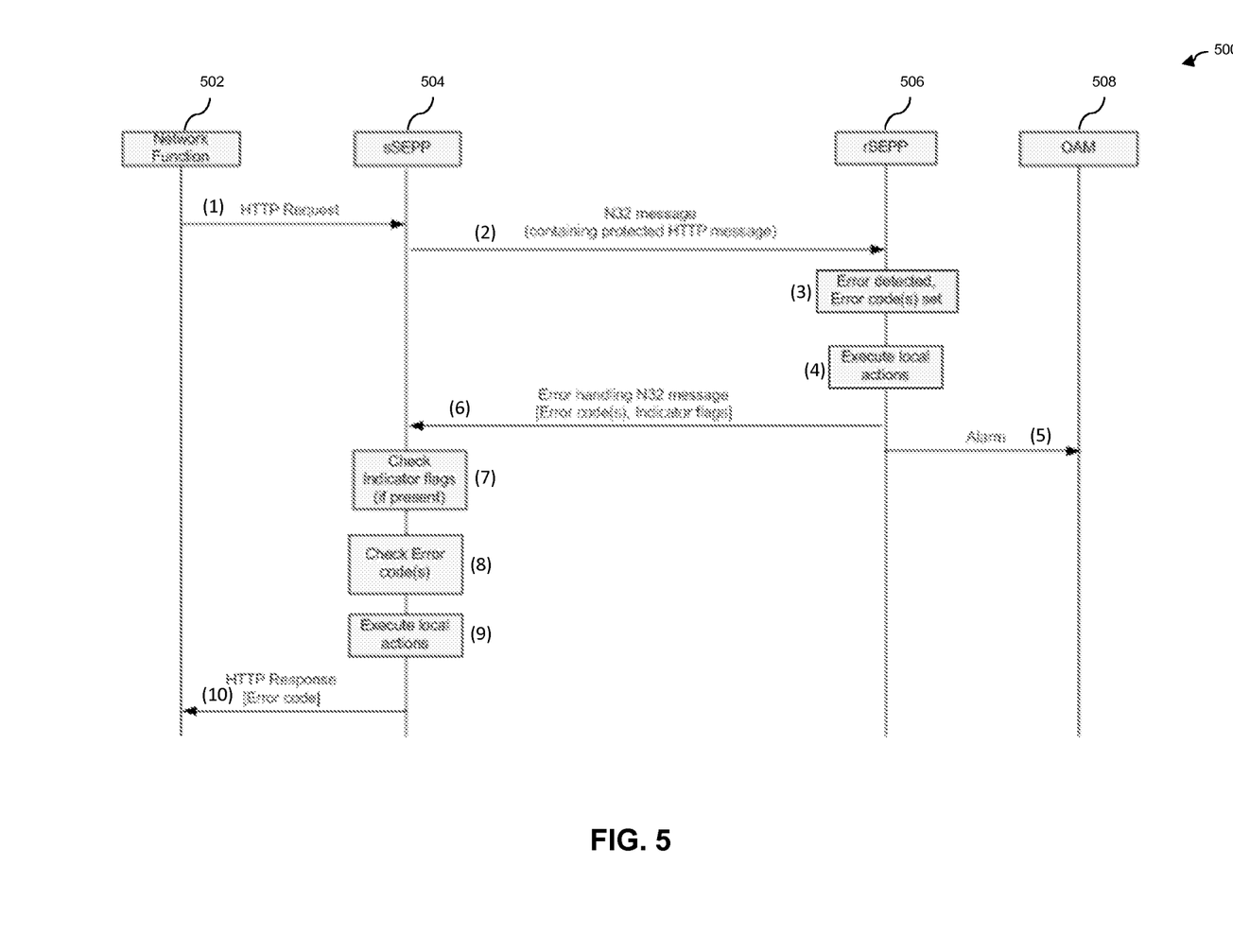
FIG. 5 illustrates a methodology for error handling for interconnect security in a communication system architecture with security edge protection proxies between a visited network and a home network, according to an illustrative embodiment.

FIG. 5 illustrates an error handling framework in the context of a methodology 500 for interconnect security in a communication system architecture with security edge protection proxies between a visited network and a home network, according to an illustrative embodiment. More particularly, as shown, a network function 502 sends an HTTP Request message to sending SEPP (sSEPP) 504 in step 1. As explained above, sSEPP 504 generates the N32 message (containing the HTTP Request message) and sends it to receiving SEPP (rSEPP) 506 in step 2. There may be one or more IPX networks in between the sSEPP 504 and rSEPP 506 but are not expressly shown for purposes of simplicity.

It is assumed that one or more errors occur with respect to the N32 message sent by sSEPP 504. The one or more errors could be caused by one or more of the above-mentioned reasons (e.g., an integrity check failure, a packet loss, an MITM attacker, etc.) or some other reason. In accordance with illustrative embodiments, the four-part error handling framework operates as follows:

(1) Error Detection in rSEPP and Decision Making

This section describes an illustrative embodiment of part one of the four-part error handling framework. Alternative or additional steps may be implemented as needed for a particular error condition.

In step 3, rSEPP 506 detects the one or more errors and generates one or more appropriate error codes.

In accordance with illustrative embodiments, the error detection in rSEPP 506 may occur in one of two ways:

a) Multi-level error detection. In one embodiment of error detection, rSEPP 506 completes all steps required for complete verification of all the fields of the received message and uses a bitmap data structure to record different failures in all fields of the received message. rSEPP 506 then analyzes the bitmap data structure to make a decision on what needs to be done next, i.e., what one or more error handling actions to take.

b) One-step error detection. In an alternative embodiment of error detection, rSEPP 506 stops at the occurrence of the first error and comes up with a decision on actions to be taken. In one example, the first critical error detected stops the detection step and triggers the decision making step. What error is critical or not can be predetermined by the network operator and the rSEPP configured accordingly.

One or more error codes are generated. The error code generated depends on the type of error detection used (e.g., multi-level or one-step). For example, when multi-level error detection is used, the error code captures all the errors detected. rSEPP 506 analyzes the error code(s) and decides on the next action, as explained below.

(2) Error Handling in rSEPP

This section describes an illustrative embodiment of part two of the four-part error handling framework. Alternative or additional steps may be implemented as needed for a particular error condition.

In step 4, rSEPP 506 executes local actions. The kind of actions taken by rSEPP 506 may be either based on configuration or analytical tools that are available in rSEPP 506.

By way of example only, the following are types of actions that may be taken by rSEPP 506:

a) Report to the Operation, Administration and Management (OAM) network 508 of the network operator (i.e., the operator of the network for which rSEPP 506 serves as a secure edge protection proxy) via logging, alarms, etc. (step 5).

b) Report back to sSEPP 504 (further illustratively described in section (3) below). This may comprise sending a message to sSEPP 504 with one or more of the following instructions: (i) request sSEPP 504 to resend the message over a different IPX route; trigger renegotiation of a security mechanism with sSEPP 504 using different security parameters. In one or more illustrative embodiments, this may result in end-to-end (e2e) TLS being used between the two SEPPs instead of ALS at the HTTP layer.

c) Depending on the error, there may be a need for renegotiation with rSEPP's trusted IPX provider (called rIPX), which includes re-authenticating and re-establishing TLS between rSEPP and rIPX. This action may also involve a reissue of IPX credentials such as certificates, shared secret, etc.

(3) Signaling Flow to Update sSEPP

This section describes an illustrative embodiment of part three of the four-part error handling framework. Alternative or additional steps may be implemented as needed for a particular error condition.

The existing N32 based interconnect interface is used by rSEPP 506 to send an N32 signaling message to sSEPP 504. This is denoted as step 6 in FIG. 5.

In one or more illustrative embodiments, a new SEPP-to-SEPP N32 signaling message is created for this purpose. For example, in one embodiment, the new message comprises the error code(s) generated in part one of the framework, with an additional set of elements or indicator flags that direct sSEPP 504 to initiate and/or perform a certain set of recovery actions on its end.

The indicator flags, when set by rSEPP 506, are checked (step 7) and used in sSEPP 504 to execute a specific set of actions. The following are some non-limiting examples of indicator flags used and the actions they represent:

a) Use a different IPX route, for example, to bypass any detected malicious nodes.

b) Request end-to-end TLS to communicate directly to rSEPP 506 avoiding the IPX network.

These messages are protected by the SEPP's application layer security mechanism.

(4) Error Handling in sSEPP

This section describes an illustrative embodiment of part four of the four-part error handling framework. Alternative or additional steps may be implemented as needed for a particular error condition.

The sSEPP reviews the obtained error code(s) (step 8) and takes appropriate actions:

a) Execute local actions (step 9). The sSEPP 504 executes actions locally which may involve reporting to the operator's OAM network (not expressly shown in FIG. 5 for the network associated with sSEPP 504) via logging, alarms, etc.

b) Change the interactions of sSEPP 504 with rSEPP 506. For example:

i) If directed by rSEPP 506, sSEPP 504 determines whether there are one or more alternate sending routes available to rSEPP 506, and if available, resends the message over at least one of the one or more alternate routes.

ii) Re-check or re-negotiate the security profile (e.g., cipher suites, etc.) which had been initially agreed upon in a preceding handshake procedure between sSEPP 504 and rSEPP 506.

iii) If directed by rSEPP 506 or if deemed necessary by sSEPP 504, sSEPP 504 establishes an alternate security mechanism (such as, for example, e2e TLS) directly with rSEPP 506.

c) Update the source network function (step 10). Send a "Failure" HTTP Response message to the source NF 502 after appropriate repackaging (with the N32 error code appropriately mapped to a corresponding HTTP error code). In one illustrative embodiment, NF 502 is unaware of security error codes and receives a generic HTTP failure message with the HTTP error code closely mapped to the N32 error code. In another illustrative embodiment, NF 502 is aware of security error codes, and therefore there is no need to map N32 error codes to HTTP error codes.

It is to be appreciated that one or more of the parts of the error handling framework illustratively described above in the context of FIG. 5, as well as in alternative embodiments, may overlap with one or more other parts of the error handling framework.

It is to be further appreciated that, in one or more illustrative embodiments, two SEPPs may discover each other based on one or more procedures including, but not limited to, Dynamic Host Configuration Protocol (DHCP) or local configuration and uniform resource identifier (URI)-enabled Name Authority Pointer (U-NAPTR) resource records in a Domain Name System (DNS), FQDN configuration in a local database, etc.

It should therefore again be emphasized that the various embodiments described herein are presented by way of illustrative example only and should not be construed as limiting the scope of the claims. For example, alternative embodiments can utilize different communication system configurations, user equipment configurations, base station configurations, key pair provisioning and usage processes, messaging protocols and message formats than those described above in the context of the illustrative embodiments. These and numerous other alternative embodiments within the scope of the appended claims will be readily apparent to those skilled in the art.

We claim:

1. A method comprising:

in a 5G communication system comprising a visited public land mobile network operatively coupled to a home public land mobile network, wherein the visited public land mobile network comprises a first security edge protection proxy element operatively coupled to a second security edge protection proxy element of the home public land mobile network, and wherein one of the first security edge protection proxy element and the second security edge protection proxy element is a sending security edge protection proxy element and an other of the first security edge protection proxy element and the second security edge protection proxy element is a receiving security edge protection proxy element;

receiving a message at the receiving security edge protection proxy element from the sending security edge protection proxy element;

detecting, at the receiving security edge protection proxy element, one or more error conditions associated with the received message; and determining, at the receiving security edge protection proxy element, one or more error handling actions to be taken in response to the one or more detected error conditions.

2. The method of claim 1, further comprising the receiving security edge protection proxy element generating one or more error codes corresponding to the one or more detected error conditions.

3. The method of claim 1, further comprising the receiving security edge protection proxy element at least one of initiating and performing the one or more error handling actions.

4. The method of claim 3, wherein the one or more error handling actions comprise the receiving security edge protection proxy element notifying a network element about the one or more error conditions.

5. The method of claim 4, wherein the network element comprises an operation, administration and management network.

6. The method of claim 3, wherein the one or more error handling actions comprise the receiving security edge protection proxy element re-establishing one or more security credentials with one or more network elements.

7. The method of claim 6, wherein at least one of the one or more network elements comprises an intermediary network node operatively coupled between the first visited public land mobile network and the home public land mobile network.

8. The method of claim 3, wherein the one or more error handling actions comprise the receiving security edge protection proxy element signaling the sending security edge protection proxy element.

9. The method of claim 8, wherein the signaling occurs over an N32 interface.

10. The method of claim 8, wherein the signaling comprises signaling the sending security edge protection proxy element to resend the message to the receiving security edge protection proxy element using a different route.

11. The method of claim 8, wherein the signaling comprises signaling the sending security edge protection proxy element to utilize a different security mechanism to communicate with the receiving security edge protection proxy element.

12. The method of claim 11, wherein the different security mechanism comprises an end-to-end encryption operation associated with a transport layer security protocol.

13. The method of claim 8, wherein the signaling comprises the receiving security edge protection proxy element sending an error handling message to the sending security edge protection proxy element.

14. The method of claim 13, wherein the error handling message comprises one or more indicator flags set to instruct the sending security edge protection proxy element on the one or more error handling actions to take.

15. The method of claim 13, wherein the error handling message comprises one or more error codes corresponding to the one or more detected error conditions.

16. The method of claim 1, wherein the detecting and determining step further comprise:
the receiving security edge protection proxy element:
performing complete verification of all fields of the received message;
using a bitmap data structure to record different failures in all fields of the received message; and
analyzing the bitmap data structure to determine the one or more error handling actions to be taken.

17. An article of manufacture comprising a non-transitory computer-readable storage medium having embodied therein executable program code that when executed by a processor causes the processor to perform steps of:
in a 5G communication system comprising a visited public land mobile network operatively coupled to a home public land mobile network, wherein the visited public land mobile network comprises a first security edge protection proxy element operatively coupled to a second security edge protection proxy element of the home public land mobile network, and wherein one of the first security edge protection proxy element and the second security edge protection proxy element is a sending security edge protection proxy element and an other of the first security edge protection proxy element and the second security edge protection proxy element is a receiving security edge protection proxy element;
receiving a message at the receiving security edge protection proxy element from the sending security edge protection proxy element;
detecting, at the receiving security edge protection proxy element, one or more error conditions associated with the received message; and
determining, at the receiving security edge protection proxy element, one or more error handling actions to be taken in response to the one or more detected error conditions.

18. Apparatus comprising:
in a 5G communication system comprising a first visited public land mobile network operatively coupled to a home public land mobile network, wherein the visited public land mobile network comprises a first security edge protection proxy element operatively coupled to a second security edge protection proxy element of the home public land mobile network, and wherein one of the first security edge protection proxy element and the second security edge protection proxy element is a sending security edge protection proxy element and an other of the first security edge protection proxy element and the second security edge protection proxy element is a receiving security edge protection proxy element;
at least one processor coupled to a memory associated with the receiving security edge protection proxy element, the memory including computer program code, the memory and the computer program code being configured to, with the at least one processor, cause the apparatus at least to:
receive a message at the receiving security edge protection proxy element from the sending security edge protection proxy element;
detect, at the receiving security edge protection proxy element, one or more error conditions associated with the received message; and
determine, at the receiving security edge protection proxy element, one or more error handling actions to be taken in response to the one or more detected error conditions.

* * * * *